United States Patent [19]

Hormann

[11] Patent Number: 4,625,291

[45] Date of Patent: Nov. 25, 1986

[54] PROCESS FOR MONITORING A DRIVEN, MOVABLE DOOR OR THE LIKE

[75] Inventor: Michael K. Hormann, Steinhagen, Fed. Rep. of Germany

[73] Assignee: Hormann KG, Harsewinkel, Fed. Rep. of Germany

[21] Appl. No.: 537,366

[22] PCT Filed: Jan. 11, 1983

[86] PCT No.: PCT/DE83/00002

§ 371 Date: Sep. 9, 1983

§ 102(e) Date: Sep. 9, 1983

[30] Foreign Application Priority Data

Jan. 11, 1982 [DE] Fed. Rep. of Germany ....... 3200511

[51] Int. Cl.[4] .......................... G05B 1/03; G05D 3/20; E05F 15/16
[52] U.S. Cl. ......................................... 364/550; 49/26; 318/265; 364/184
[58] Field of Search ............... 364/167, 189, 513, 550; 318/264, 265, 266; 187/29 R; 49/26, 28, 31

[56] References Cited

U.S. PATENT DOCUMENTS

| | | | |
|---|---|---|---|
| 3,376,486 | 4/1968 | Caputo | 318/257 |
| 4,261,440 | 4/1981 | Jacoby | 49/28 X |
| 4,328,540 | 5/1982 | Matsuoka et al. | 364/167 |
| 4,338,553 | 7/1982 | Scott, Jr. | 318/266 X |
| 4,342,379 | 8/1982 | Games et al. | 187/29 R |
| 4,347,465 | 8/1982 | Goertler et al. | 318/266 |
| 4,408,146 | 10/1983 | Beckerman | 318/264 |

Primary Examiner—Felix D. Gruber
Attorney, Agent, or Firm—Max Fogiel

[57] ABSTRACT

A process for controlling the movement of a motorized door is disclosed. Also, a control apparatus that has a close loop feedback system for use in controlling a motorized door is disclosed. The invention provides for improved safety by incorporating improved obstacle sensing thresholds through the use of a comparator system.

47 Claims, 5 Drawing Figures

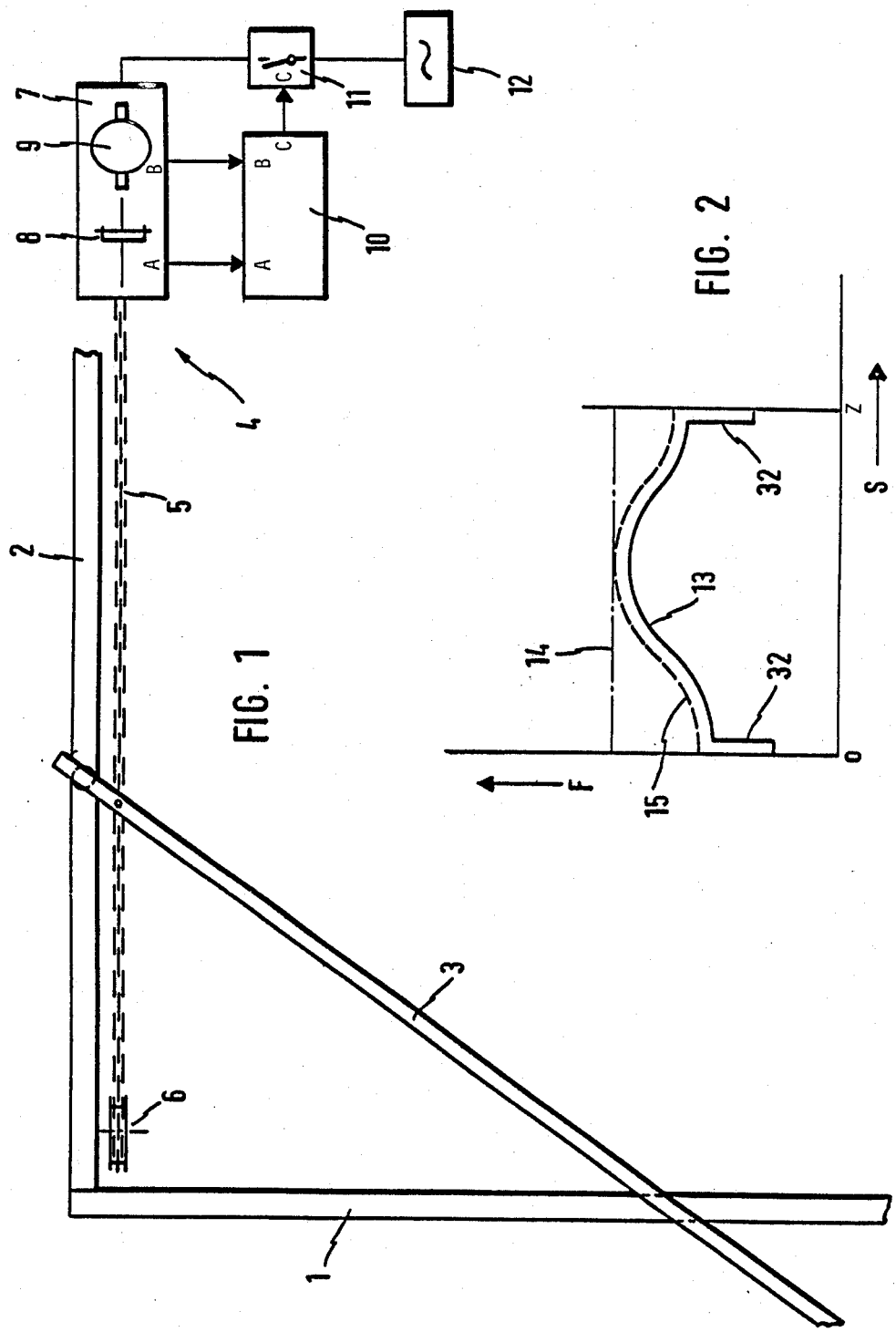

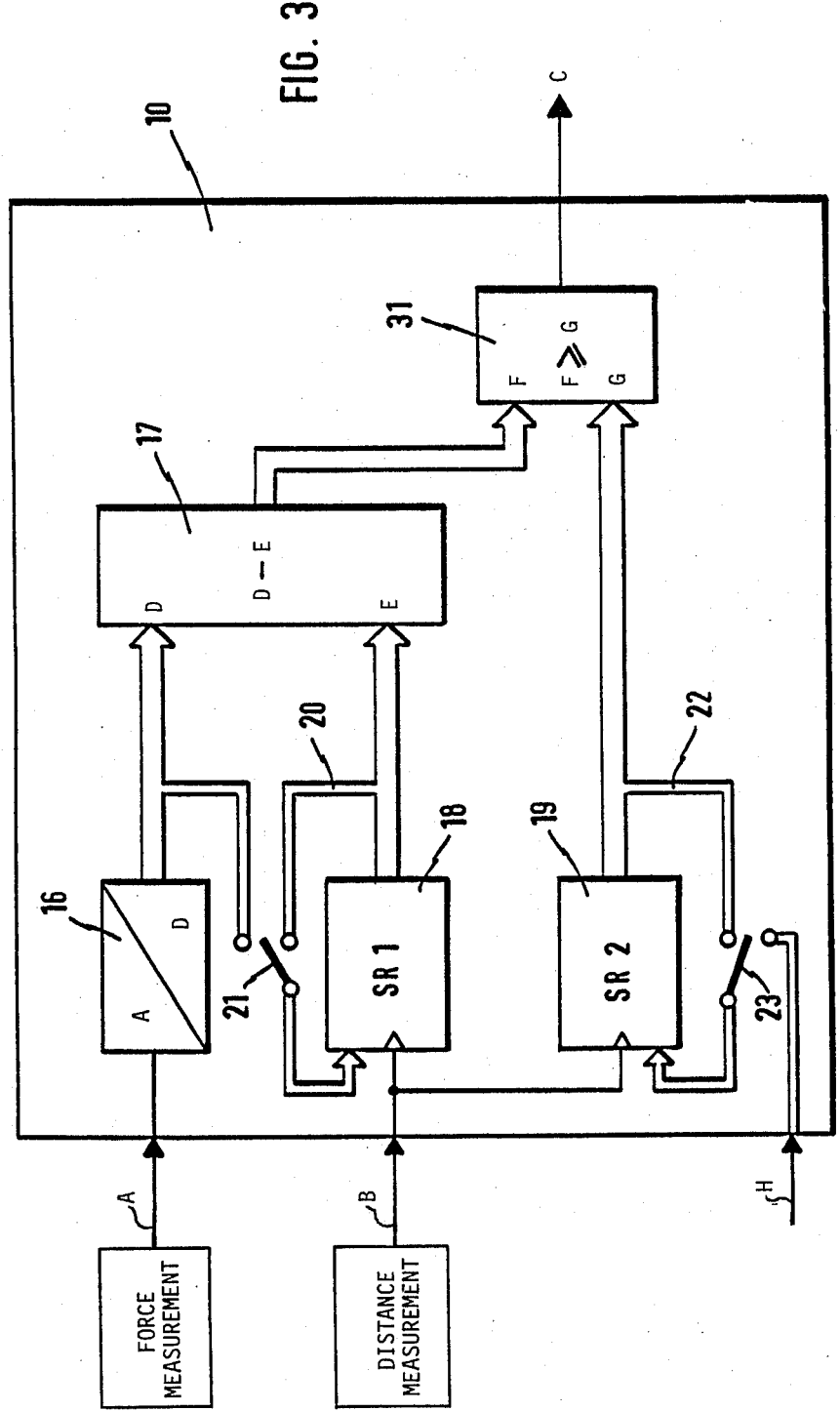

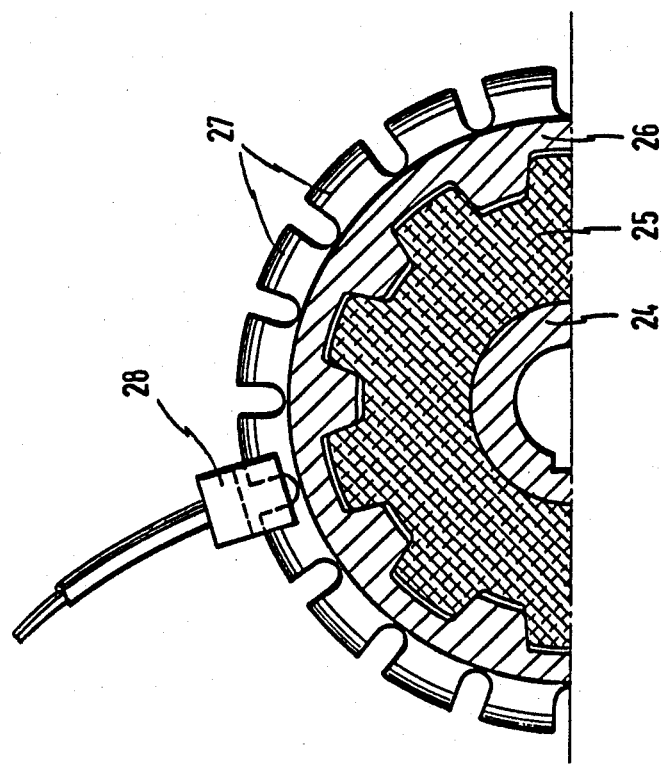
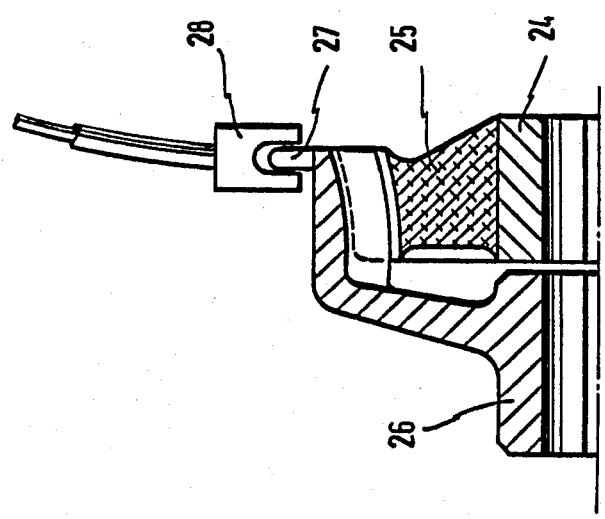
FIG. 4

PROCESS FOR MONITORING A DRIVEN, MOVABLE DOOR OR THE LIKE

BACKGROUND OF THE INVENTION

The present invention concerns a process for monitoring the movement of a motorized door, including an electrical system for carrying out the process. Power operated doors and gates must be monitored by associated electrical systems to prevent them from causing damage to objects or injuries to persons which unintentionally come into the path of the motion of the door while it is being operated. In the past, various devices have already been developed that offer such protection against obstacles in the door's path. Presently, electrical sensors or the like are arranged under elastic strips along the edge of a given door or gate which forms electric contacts which switch off the drive or reverse the direction of movement of the door when the switch is tripped. Such sensors, of which the sensitivity may be a function of the their design, can be arranged anywhere along the door or gate being driven. However, such switches are ineffective when an obstacle such as a car or other vehicle runs into the door being closed outside the edge or location in which such switches are located.

Other systems presently used measure the delay of the door, being driven by a power transmission, by detecting or otherwise sensing an increase in the loading of a driving chain or driving transmission of some sort. Generally, these systems are designed such that any increase in the driving force, than normally necessary to move the door, will cause a switching action such as to reverse or stop the door.

All the above described monitoring systems and devices are based on the fact that a certain force is necessary for the normal, unobstructed movement of a door or gate. The driving force necessary is monitored to see whether it exceeds a certain, preset difference value. This threshold value or difference value would understandably be the greatest force which would be encountered in the normal operation of the door or gate.

The force necessary for the movement of a door or gate, particularly an overhead door being raised along a track in an upright position as disclosed in the later drawings, is not constant over the entire path of operation. This inconsistency can be due to the construction of the door, and it occurs when wind effects and other local conditions of operation are also taken into account. Different weight relations and friction effects occur in many doors because of the displacement of the door leaf, but can be compensated for only after great expense. Such compensation is quite difficult under most practical operating conditions and environments. An example of these difficulties can be observed in the case where the door weight being driven along a track is compensated for by springs which may exert a differing force when wear occurs or there are different operating temperatures, or other types of damage which can be observed in industrial use. Consequently, the value of the drive force required to move a door in question, such as that disclosed in the present invention, is dependent on the tracks provided for the movement of said door, or what can be described as the transfer path. The maximum value of the force required has been used in the past as the criterion for the setting of threshold limits for switching off the drive motor.

SUMMARY OF THE INVENTION

The improvement realized in the present invention is that the threshold of the value used for the safety switching of the power drive varies in accordance with the position of a door being driven. Generally, the present invention alters the threshold value used to switch off or reverse the drive according to the position of the a door along its track.

Accordingly, it is the object of the present invention to provide a motorized door or gate driving system which provides a substantially more sensitive safety threshold to switch off or reverse the door or gate when it encounters an obstacle in its path of varying types.

SUMMARY

It is proposed that the monitoring of the movement process of a door leaf which can be power-operated along the transfer section should be made substantially more sensitive for the case of an obstacle by switching off or reversing the drive in such a manner that the movement characteristic which actually occurs as a function of the transfer distance is continually sensed for each of the consecutive cyclic door leaf movements being monitored, and the signal thus obtained is compared with a function scanned simultaneously for each movement monitored, which function was recorded and stored for the unobstructed, normal operation as a function of the door leaf movement to be monitored before putting the door into operation.

BRIEF DESCRIPTION OF THE DRAWINGS

Other objects and advantages of the invention will become apparent upon reading the following detailed description and upon reference to the drawings in which like numerals refer to like parts and in which:

FIG. 1 shows a schematic view of an overhead, one piece door leaf with a block diagram of the device for carrying out the process.

FIG. 2 is a diagram of a typical curve of the driving force output which would be required of a motorized driving system for a overhead door.

FIG. 3 is a block diagram of a digitally operated sampling and comparator circuit.

FIG. 4 is an example of a door position indicator sensor converting the analog position of a given door to a digital output.

DETAILED DESCRIPTION OF THE PREFERRED EMBODIMENT

Figure 5:
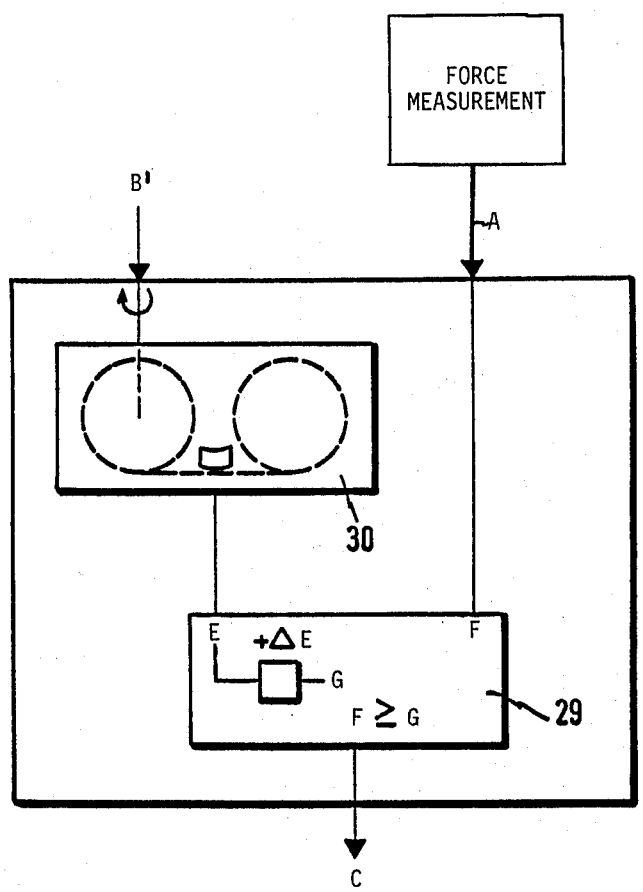
FIG. 5 is a block diagram of an analog comparator circuit.

In the preferred embodiment, an overhead door is used as an example, as shown in FIG. 1 in the form of a vertical frame 1 and a horizontal runner rail 2 in which door leaf 3 is moved. The door leaf 3 is hinged to a frame via lever bars, not shown, and provided with compensating springs, not shown, which are to equalize the drive force over the entire movement section. The design of an overhead hanging door with a chain drive as shown in FIG. 1 is well known to those skilled in the art, and are commonly used in many application, including motorized garage doors. The door drive 4 design as a whole consists of a drag chain 5 which operates through a fixed deflection roller 6 and also over a drive roller which is mounted in the motor drive assembly 7. Coupling 8 can be used as a stepdown gear connecting electric motor 9 to drive assembly 7. Comparator circuit 10 is connected with the motor assembly 7 via terminals A and B. The output of comparator 10 at C is connected to control switch 11 which connects the electric motor 9 to the main power supply 12. Main power supply 12 is simply a conventional power source, the voltage of which is determined by the general requirements of motor 9. Control switch 11 is normally closed as it is an auxiliary switch. The routine on and off switching of the drive 4 is accomplished by conventional switching systems, which include door end sensors or motor torque sensors as above desribed.

Turning now to FIG. 2, a diagram of the drive force F plotted against the door position S is shown. As can be seen in FIG. 2, in spite of the above mentioned compensating spring assemblies normally used in the prior art, one can observe that the drive force required to adequately move the door varies depending on the position of the door along its track. Line 13 in FIG. 2 corresponds to the characteristic curve which describes a possible varying drive requirement compared to the instantaneous position of the door as it is moved from an open to a closed, or vice versa, position. The dotted line 15 generally tracks the shape of the curve 13, but indicates a slightly higher force for each position S. The difference between line 15 and line 13 will be described as $\Delta F$. $\Delta F$ describes the threshold value with which accident prevention devices should ideally operate. If line 13 represents a required force for the normal operation of the door at any particular location along its track, any increase in force required to drive the door would indicate a problem of some sort. This problem can be an obstruction in the path of the door, or some other operating difficulty. Ideally, safety requirements would indicate that when the force required to move the door exceeds a slight value, $\Delta F$ as described, the driving system supplying the force should be reversed or shut-off to prevent damage or injury.

It will be appreciated by those skilled in the art that the present systems utilized for over-forced threshold shut-off utilize a fixed constant of force as a threshold value. Line 14 in FIG. 2 illustrates the threshold design used in conventional systems. It will be appreciated that the force described by line 14 must be set high enough so that normal operation over the entire distance of the travel of the door fall below said value in normal operation. Therefore, while there may be an adequate safety margin in the middle of the curve shown in FIG. 2, located at the point where lines 13 and 14 are the closest, the safety margin present at the point where S equals 0 and S equals Z grows larger. It will be appreciated by those skilled in the art that it is preferable to allow a variable safety threshold level, such as line 15, to track the actual force necessary, as depicted in line 13, so that $\Delta F$ remains virtually constant over the entire travel distance S.

FIG. 3 shows an example of a circuit 10' which may be used in applying the present invention. A signal describing the driving force requirement of the door as a function of the distance S traveled, is sent to the circuit 10' via the connecting line a as shown. The signal used to describe the driving force can be a signal derived directly from the driving force, from the torque of motor 9 or from the power consumption of the motor 9. Means to accomplish this are well known to those skilled in the art and are identical to those used in present door drives and applications utilized in the prior art. This force signal in analog form is applied through terminal A to analog-digital converter 16 whose digital output is sent to subtracting circuit 17. A signal representing the distance travelled by the door along its track, which is signified by axis S in FIG. 2, is in the form of a pulse signal as applied to circuit 10 through connecting terminal B shown in FIG. 3. This pulse signal, which represents an increment in the value of S in FIG. 2, is sent to the stepping input of a function storage component in the form of a shift register 18. The output signal of the shift register is sent to a second input E of the subtracting circuit 17. The S value pulse signal fed in at B is sent parallel to the stepping input of other shift register 19 in which the difference value $\Delta F$ is stored. It will be appreciated that $\Delta F$ can be set at any value which the particular design would indicate. It is not necessary to store a fixed value of $\Delta F$ in shift register 19. It is possible that $\Delta F$, as described in FIG. 2 as the difference value at any point S of line 15 and line 13, may be varying over the length of the curve so as to provide greater or less margins of safety at various positions of the door as desired.

A feedback line 20 is lead from the shift register 18 via a switch 21 to the read input of the shift register. It will be appreciated that the output value from shift register 18 is feedback through feedback line 20 to the input of 18, thus maintaining the stored function in circulation. In the same manner, the output of the shift register 19 is sent to the storing input of the shift register 19 via feedback line 22 and switch 23.

In the alternative position, the switch 21 can be connected to the output of the analog digital converter 16 so that the force signal, which is fed in at A, can be sent to storing input of shift register 18, depending on the door. This creates the ability to store a particular value of force used at any particular position of the door which would be observed during unobstructed, normal operation of the door. Thereafter, it is possible to rerecord the force value required for each position of the door after certain periods of time to allow for normal aging, and wear and tear which would necessarily change the amount of force necessary.

By operating the change over switch 23, the storing input of the shift register 19 can be connected in a similar manner to a storing terminal H in order to store or change the $\Delta F$ values. In this fashion, it is possible to record new values of $\Delta F$ which may be desired after changing operating conditions of the door, or for any other reason it may be desired.

If the force required for the unobstructed normal operation is entered into the shift register 18, the switch 21 is connected to line 20. Assuming the values of $\Delta F$ are already stored, the device is now ready to monitor the movement of the door leaf.

If the door leaf is now moved, the value of the actual force required to move the door is recorded for each cycle of the door monitored, and sent via terminal A to the analog digital converter 16 which sends the digitalized values via the input D to the subtracting circuit 17. The door position-dependent pulse signal is, at the same time, sent via B to the stepping input of the shift register 18, which then sends the function values corresponding to the normal operation to the input E of the subtracting circuit 17, depending on the position of the door. The corresponding functional values describing the operating parameters which would be present during normal, unobstructed operation of the door are thus compared to the position signals actually reached for each sampling point for the position of the door. The intervals between sampling can be varied according to requirements. It will be apparent to those skilled in the art that it is possible to sample the force value through A either at one inch intervals or one foot intervals, for example, according to the desired accuracy.

The difference between the recorded function values and the actual values being experienced by the door is the difference between the values D and E appearing at the inputs D and E of the subtracting circuit 17. This difference value is sent to comparator 31 via the first input F. The door position-dependent corresponding values for ΔF are feed to input G of comparator 31. No signal appears on the output of the comparator circuit 31 as long as D minus E is smaller in absolute value than the corresponding position-dependent value ΔF. However, if the difference between the actual value and the recorded value exceeds the position-dependent corresponding value of ΔF, a signal which interrupts the current supplied to the drive motor 9 appears at the output C of the comparator circuit. It is, of course, also possible to induce a reversal of the direction of the door by motor 9.

FIG. 4 shows a possible embodiment of a door position signal transmitter in the form of a shaft rotation digitizer. A coupling, such as can be provided between the drive wheel of the drag chain 5 and the output of a stepdown gear following the drive motor 9, is shown in an axial cross section and in a radial section. The driven coupling half 24, being a torsionally elastic coupling member, is designed as a radial intermediate layer between the teeth and the hub in the form of a rubber ring 25. The driven coupling half 26 has teeth 27 on its radial circumference, which mesh with the feeler probe 28. The feeler probe 28 measures the change in the magnetic conductivity between the teeth, which are made of ferromagnetic material, and the tooth spaces 27 between them. In this manner, probe 28 generates electrical pulse signals the sum of which corresponds to the distance travelled by the door, which is described by the extent of rotation of the coupling.

Thus the analog-digital converter includes a component carried by the door along the track during movement of the door. This component includes a sawtooth pattern with alternating zones of different magnetic conductivities. A fixed sensor responds to changes in the resulting magnetic field between the sawtooth pattern and the sensor. The sawtooth pattern is prepared in the circumferential region of a disk driven by the driving force. The sampling device provides an analog output which converts from linear movement input to a corresponding voltage output.

As was previously mentioned, it is possible to sample the force utilized at any particular door position by measuring various operating parameters of the system. For example, the force utilized to move the door may be sampled by considering the torque being transmitted from the motor to the door. This can be accomplished by measuring the rotation between two moving parts, such as coupling halves 24 and 26, as described above. Various known devices, such as strain gauges or electromagnetic probes, can measure even minor displacements, and thus can be used as sensors to measure the door position and thus generate a position signal. Further, it is also possible to measure the input power to the motor being used to generate the force by considering sampling the input power for use as input information in the present invention. Means for accomplishing measurement of both force and position of the door in the present invention are well known to those skilled in the art, and are presently used in the prior art.

Turning now to FIG. 5, a different embodiment of comparator circuit 10 will be described. FIG. 5 shows a sampling and comparing device which operates with analog signals. Here, a preset difference signal between the actual force being utilized and the stored value of the force utilized in normal operation is added to the stored value as a quantity ΔE, which is constant over the entire movement process.

The signal describing the normal sampled force for a given position is sent as an analog magnitude to the input F of a comparator circuit 29, via terminal A. A mechanically driven function storage unit in the form of a tape cassette 30 is connected to the drive via gears over the connection B', in a manner not shown in detail, which can be achieved in many ways well known to those skilled in the art. In such a manner, the actual position information is transferred to the recording tape without slip. This recording tape shall already contain the various sampled force values for a given position of the door taken during unobstructed normal operation of the door. It is, of course, possible, by this arrangement, to design the connecting terminal A for recording the initial force and position information as it is sampled, to be recorded onto the signal input of the recording tape for intitial storage of this information.

The sampled force signal is compared with the position value signal after the value E has been added to it, and appears at the output of the cassette, which is connected to the input E of comparator 29, as a function of the mechanically driven movement, and thus the actual distance of the door travelled. The result of this addition is compared with value F and a signal is present at terminal C in the case when the signal value F exceeds the stored, sampled force value, plus the difference value ΔE, for a given position, presented as value G in FIG. 5. This output C may be used to control switch 11 in FIG. 1 to switch off or reverse the system.

The above described examples by no means exhaust the possibilities for the design of a device for carrying out the process according to the present invention. The present invention may be utilized in a combination in which the signal values sampled, processed and detected in mixed, analog and digital form. The sensitivity in the case of digital processing is dependent on the actually intended resolution of the sampling devices, and can be increased almost without limit with sampling devices as they now exist. In the case of digital function storage components, the various sampled values for both the force and the position of the door can be obtained by coding, such as binary coding, with relatively small storage capacity, even at high resolution. Further, it is possible that the stored function, which is the sampled force for a given door position, can be used to supply a switch off signal for the drive at the start or end of the movement of the door, thus serving to switch the door off at the end of the movement of the normal operation. In the prior art, simple limit switches have been used for this purpose which trip when they are mechanically activated by the movement of the door at the end of the track.

While the invention has been described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims.

What is claimed is:

1. An apparatus of monitoring the movement of a drivable, single-piece or multipiece leaf of a door along a track between an open position and a closed position and for interrupting this movement when said door encounters an obstacle in the path of the door as said door moves, comprising:

a door;

a track guiding said door in a predetermined path and allowing said door to open and close;

a motor connected to said door for providing a driving force to open or close said door;

sampling means for continuously sampling the value of said driving force used to open or close said door;

means for receiving the position of said door relative to said track;

comparator means operatively connected to said sampling and said receiving means whereby the sampled force dependent on the motor driving force when driving said door, for each position of said door, is compared with recorded sample force applied by the motor when driving said door under a previous recorded condition when said path of the door is free from an obstacle, said comparator means having an output providing a difference signal representing a variation in the driving force of said motor for a given position of said door;

and means for comparing said difference signal to a preset difference signal and generating an interrupt signal for interrupting movement of the door when said present difference value is exceeded.

2. The apparatus as in claim 1 wherein said sampling means comprises an analog-digital converter.

3. The apparatus as in claim 2 wherein said analog-digital converter includes a component carried by the door along the track during movement of said door, said component including a sawtooth pattern with alternating zones of different magnetic conductivities, a fixed sensor responding to changes in the resulting magnetic field between said sawtooth pattern and said sensor.

4. The apparatus as in claim 3 wherein said sawtooth pattern is prepared in the circumferential region of a disk driven by said driving force.

5. The apparatus as in claim 1 wherein said sampling means provides an analog output converting from linear movement input to a corresponding voltage output.

6. A process for monitoring and controlling the movement of a motor driven door along a track between an open and closed position and for interrupting the movement when the door encounters an obstacle or other abnormal resistance to its movement comprising the steps of:

generating signals corresponding to the force used to drive said door along said track, and sampling said signals at given positions along said track during a recorded previous operation of said door when an obstacle was not encountered by said door;

generating signals corresponding to the force used to drive said door along said track and sampling said signals at said given positions along said track, during a present operation of said door, said force varying as a function of a position along said track;

storing the signals corresponding to the force used to drive the door along the track during said recorded previous operation of the door when an obstacle was not encountered by the door;

comparing said signals corresponding to the sampled values of force for said recorded previous operation and said present operation to derive a difference value thereof for each sampled position of the door; comparing said difference value to a preset value representing a desired safety margin; and generating an interrupt signal when said derived difference value exceeds said preset value.

7. The process of claim 6 wherein said preset value is preset at a constant value over the entire range of positions of said door.

8. The process of claim 7 wherein said signals corresponding to the force used to drive the door along the track during said recorded previous operation of the door are stored for normal unobstructed operation after installation of said door and track at the place of use.

9. The process of claim 8 wherein said signals are sampled and stored again after a certain number of operations of said door.

10. The process of claim 9 wherein the sampled force is derived by sampling the force output of said motor directly.

11. The process of claim 9 wherein the sampled force is derived by sampling the torque of said motor.

12. The process of claim 9 wherein the sampled force is derived by measuring an angle of rotation between two rotary members coupled elastically with one another, and arranged one after the other in the direction of the drive force.

13. The process of claim 9 whereby the sampled force is derived by sensing the electrical drive power of an electric drive motor for said door.

14. The process of claim 8 wherein the sampled force is derived by sampling the force output of said motor directly.

15. The process of claim 8 wherein the sampled force is derived by sampling the torque of said motor.

16. The process of claim 8 wherein the sampled force is derived by measuring an angle of rotation between two rotary members coupled elastically with one another, and arranged one after the other in the direction of the drive force.

17. The process of claim 8 wherein the sampled force is derived by sensing the electrical drive power of an electric drive motor for said door.

18. The process of claim 7 wherein said signals corresponding to the force used to drive the door along the track during said recorded previous operation of the door are sampled and stored again after a certain number of operations of said door.

19. The process of claim 18 wherein the sampled force is derived by sampling the force output of said motor directly.

20. The process of claim 18 wherein the sampled force is derived by sampling the torque of said motor.

21. The process of claim 18 wherein the sampled force is derived by measuring an angle of rotation between two rotary members coupled elastically with one another and arranged one after the other in the direction of the drive force.

22. The process of claim 18 wherein the sampled force is derived by sensing the electrical drive power of an electric drive motor for said door.

23. The process of claim 7 wherein said signals corresponding to the force in the recorded previous operation and the present operation are derived by sampling the force output of said motor directly.

24. The process of claim 7 wherein said signals corresponding to the force in the recorded previous operation and the present operation are derived by sampling the torque of said motor.

25. The process of claim 7 wherein said signals corresponding to the force in the recorded previous operation and the present operation are derived by measuring an angle of rotation between two rotary members coupled elastically with one another and arranged one after the other in the direction of the drive force.

26. The process of claim 7 wherein said signals corresponding to the force in the recorded previous operation and the present operation are derived by sensing the electrical power drive of an electric drive motor for said door.

27. The process of claim 6 wherein said signals coresponding to the force used to drive the door along the track during said recorded previous operation of the door are stored for normal unobstructed operation after installation of said door and track at the place of use.

28. The process of claim 27 wherein said signals corresponding to the force used to drive the door along the track during said recorded previous operation of the door are sampled and stored again after a certain number of operations of said door.

29. The process of claim 28 wherein the sampled force is derived by sampling the force output of said motor directly.

30. The process of claim 28 wherein the sampled force is derived by sampling the torque of said motor.

31. The process of claim 28 wherein the sampled force is derived by measuring an angle of rotation between two rotary members coupled elastically with one another and arranged one after the other in the direction of the drive force.

32. The process of claim 28 whereby the sampled force is derived by sensing the electrical drive power of an electric drive motor for said door.

33. The process of claim 27 wherein said signals corresponding to the force in the recorded previous operation and the present operation are derived by sampling the force output of said motor directly.

34. The process of claim 27 wherein the sampled force is derived by sampling the torque of said motor.

35. The process of claim 27 wherein the sampled force is derived by measuring an angle of rotation between two rotary members coupled elastically with one another arranged one after the other in the direction of the drive force.

36. The process of claim 27 wherein the sampled force is derived by sensing the electrical drive power of an electric drive motor for said door.

37. The process of claim 6 wherein said signals corresponding to the force used to drive the door along the track during said recorded previous operation of the door are sampled and stored again after a certain number of operations of said door.

38. The process of claim 37 wherein said signals corresponding to the force in the recorded previous operation and the present operation are derived by sampling the force output of said motor directly.

39. The process of claim 37 wherein the sampled force is derived by sampling the torque of said motor.

40. The process of claim 37 wherein the sampled force is derived by measuring an angle of rotation between two rotary members coupled elastically with one another and arranged one after the other in the direction of the drive force.

41. The process of claim 18 wherein the sampled force is derived by sensing the electrical drive power of an electric drive motor for said door.

42. The process of claim 6 wherein said signals corresponding to the force in the recorded previous operation and the present operation are derived by sampling the force output of said motor directly.

43. The process of claim 6 wherein the sampled force is derived by sampling the torque of said motor.

44. The process of claim 6 wherein the sampled force is derived by measuring an angle of rotation between two rotary members coupled elastically with one another and arranged one after the other in the direction of the drive force.

45. The process of claim 6 wherein the sampled force is derived by sensing the electrical drive power of an electric drive motor for said door.

46. The process of claim 6 wherein said comparing step is controlled by the actual position of the door.

47. The process of claim 6 wherein said sampling and storing begin at the beginning of the door movement and continue regardless of the actual movement of said door.

* * * * *